April 30, 1935.  A. O. AUSTIN  1,999,272

LIQUID LEVEL INDICATOR

Filed Feb. 13, 1932

INVENTOR
Arthur O. Austin.
BY Alpheus J. Crane
ATTORNEY

Patented Apr. 30, 1935

1,999,272

UNITED STATES PATENT OFFICE 1,999,272

LIQUID LEVEL INDICATOR

Arthur O. Austin, near Barberton, Ohio, assignor, by mesne assignments, to The Ohio Brass Company, Mansfield, Ohio, a corporation of New Jersey Application February 13, 1932, Serial No. 592,737

9 Claims. (Cl. 116—118)

This invention relates to liquid level indicators and has for one of its objects the provision of an indicator which will show the presence or absence of a liquid above a certain level in a container.

Another object is to provide means for automatically filling the space within an indicator glass with liquid from a container lower than the glass, when the surface of the liquid in said container is above a certain level.

A further object is to provide an indicator which shall be of improved construction and operation.

Other objects and advantages will appear from the following description.

The invention is exemplified by the combination and arrangement of parts shown in the accompanying drawing and described in the following specification, and it is more particularly pointed out in the appended claims.

Figure 2:
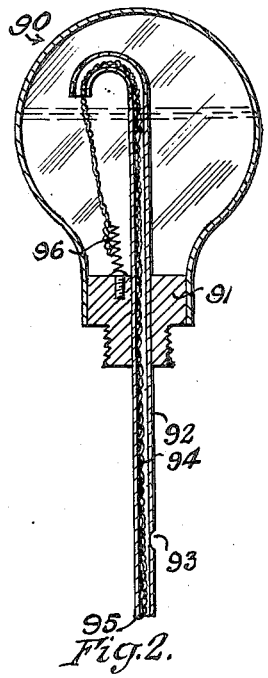
Fig. 2 is a vertical section of a modified form of the invention.

In bushings of the oil filled type, and in many other liquid containers it is frequently advisable to provide some form of indicator to show whether or not the container is filled. In the past expansion tanks having glass walls or gauge glasses have been used in connection with oil filled bushings. These are open to the objection, however, that they may be damaged mechanically or by a power arc, allowing the oil to flow out of the expansion chamber. With the breaking of the gauge glass or a glass walled expansion chamber, there is also danger that water may enter the bushing and seriously damage the bushing or apparatus upon which the bushing is used.

Some means of indication which will show that the shell of the bushing is filled with oil is all that is necessary. This preferably should be of the visible type so that the voltage will not have to be removed from the bushing in order to determine whether or not the bushing is filled.

It is preferable that the indicating means be free from mechanically moving parts in order to effect a high degree of reliability. In the drawing, I have shown an indicator in which all moving parts may be eliminated and the oil or filling liquid itself is used to indicate a safe level in the bushing or other apparatus to which the indicating gauge is attached.

Figure 1:
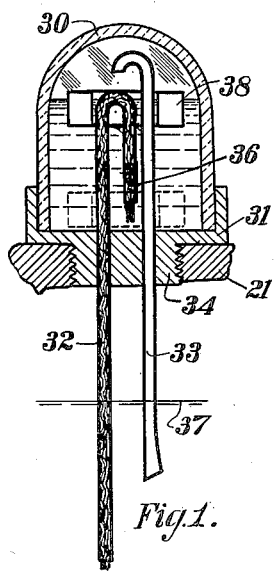
Fig. 1 is a vertical section showing one embodiment of the present invention.

The indicator in Fig. 1 comprises a sealed glass chamber 30 attached to a suitable fitting 31 having a screw plug 34 for attachment to the flange 21 of a housing containing liquid. There are two passages or tubes 32 and 33 through the plug 34. These tubes extend down into the oil chamber to the desired depth. The chamber 30 preferably has appreciable size so as to have good visibility. The tube 32 extends below the tube 33 and both tubes 32 and 33 are preferably small in diameter.

If we assume that the surface level of the oil or other liquid is at 37 so it is above the lower end of the tube 33, any contraction of the air and oil inside of the chamber 30 will draw oil up into the chamber. If the air and oil in the chamber 30 expand, due to a rise in temperature, air will be expelled through the tube 33. Thus, so long as the lower ends of both tubes are below the surface level of the oil in the bushing, the oil will be visible in the chamber 30 and expansion and contraction, due to temperature changes producing differences in pressure between the interior of chamber 30 and the interior of the bushing, will tend to pump oil into the chamber 30. If the end of the tube 33 becomes uncovered, free communication is established between the air chambers in the bulb 30 and the bushing, and oil can slowly flow out of the tube 32, thus lowering the level to the lower end of the downward projecting wick 36. A float 38 may be used to improve the visibility, particularly where a transparent oil is used.

The tube 32 may be packed with wicking or loose material which will tend to prevent the forming of an air trap and the capillary attraction will draw oil out where a syphon would ordinarily be broken by an air trap or cause too rapid a flow so that air will not be forced out of tube 33. When the lower end of the tube 33 is uncovered, the oil will be syphoned out down to the lower end of the wick 36, which will permit the float 38 to disappear below the rim of the fitting 31. Turning the ends of the tubes downward tends to insure that water will not enter the bushing even though the glass 30 should be broken. The packing may be so tight in the tube 32 that ordinary fluctuations in the difference of pressure between the inside and the outside of the chamber will confine the flow almost entirely to tube 33.

The wick or capillary member may be made of fibrous material such as cotton thread or cord or a bundle of fine wires. Where metallic elements are objectionable for the wick, the capillary system may also be made up with a combination, such as fine metallic or glass fibres bound together with cord or other material. The use of a metallic or glass capillary system eliminates the possibility of the system being saturated with water, which might temporarily interfere with the flow of oil. A system of this kind may be readily used to indicate the oil level on transformers, on expansion chambers of bushings or for various other purposes where a simple effective means is desired which will indicate a minimum level.

The tube or tubes entering the indicating chamber should not have so large a volume that the oil or liquid will simply move up and down in the tube due to the difference in pressure. The cross section of the tube must bear such relation to the volume of the indicating chamber and the variation in pressure that the displacement through the tube for temperature fluctuations is greater than the internal volume of the tube. The size of the tube may be made smaller than would otherwise be practical if the lower end is flared so that air will enter when the opening or lower end of the tube is above the surface of the oil. The upper end of the tube may be straight and, if desired, a small cap placed over same so water will not enter through the tube if the glass housing of the indicating chamber is broken. A chamber of this kind has the material advantage that it simplifies the construction, particularly of bushings, and eliminates the expansion chamber and the capillary tubes can be readily made so that they will not be a source of electrical discharge which would lower the flashover voltage of the bushing or permit electrical discharges which will cause radio interference. The system may be used on an indicating chamber or other container which is sealed to the outside air, providing the indicating chamber will withstand the variations in pressure.

The indicator has the advantage that the parts entering the bushing chamber may be very small, permitting their entrance through a very small hole and their use in a very small chamber in which it is desired to know that there is at least a minimum height of fluid. The scheme is applicable to any chamber in which it is desired to know the minimum height of fluid. By applying electrical contacts either by electrodes immersed in the chamber or to the float, it is possible to operate a signal or obtain an indication at a distance.

I claim:

1. A housing having an internal hermetically sealed cavity adapted to contain a filling liquid and having a conduit opening at its upper end into said cavity and having its lower end arranged to be submerged in a supply of filling liquid, said conduit opening into said cavity above the desired surface level of the filling liquid within said cavity to permit entrance of filling liquid to said cavity but to prevent draining of said liquid from said cavity through said conduit and a drain for said cavity having an intake opening in said cavity below the opening of the upper end of said conduit.

2. An indicator comprising a chamber having its bottom closed against direct gravity flow of liquid therefrom for containing liquid, a tube having its upper end opening near the upper portion of said chamber and having an intake opening disposed in a liquid container, and a siphon for draining the liquid from said chamber when the surface level of the liquid in said container drops below said intake opening.

3. An indicator comprising a liquid containing indicating chamber, a tube having its upper end opening near the upper portion of said chamber and having an intake opening disposed within a liquid container, and a wick having an elevated intermediate portion within said chamber and two depending legs, the lower end of one of said legs being disposed in said chamber below the upper end of said tube and the lower end of the other of said legs being disposed below the interior of said chamber for draining liquid from said chamber when the surface level of the liquid in said container drops below said intake opening the last mentioned leg of said wick being separated from the body of the liquid in said chamber.

4. The combination with a source of liquid supply, of an indicator disposed above the surface level of the liquid in said supply, said indicator comprising a closed chamber, and means for raising liquid from said supply to said chamber comprising a tube having its lower end disposed in the liquid in said supply and having its upper end opening in the upper portion of said chamber, and siphoning means for draining liquid from said chamber when the surface of the liquid in said supply drops below the lower end of said tube.

5. The combination with a source of liquid supply, of an indicator disposed above the surface level of the liquid in said supply, said indicator comprising a chamber having its bottom closed against direct gravity flow of liquid therefrom, a tube having its lower end extending into the liquid in said supply and having its upper end opening in said chamber, and a wick for draining the liquid from said chamber when the surface level of the liquid in said supply drops below the lower end of said tube said wick having an elevated intermediate portion within said chamber and two depending legs, one of said legs having its lower end disposed in said chamber near the bottom thereof, the other of said legs extending outside of said chamber and below the bottom thereof, said last mentioned leg being separated from the body of said liquid within said chamber.

6. The combination with a source of liquid supply, of means for indicating the surface level of the liquid in said supply, said means comprising a chamber disposed above the surface of said liquid and having its bottom closed against direct gravity flow of liquid therefrom, a tube having its lower end adapted to extend into said liquid and having its upper end opening in said chamber, and a wick in the form of a siphon for draining the liquid from said chamber, said wick having one leg thereof separated from the body of liquid within said chamber.

7. The combination with a source of liquid supply, of means for indicating the surface level of the liquid in said supply, said means comprising a closed chamber located above the surface level of said liquid and having its bottom closed against direct gravity flow of liquid therefrom, a tube having its lower end extending into said liquid and having its upper end opening into the upper part of said chamber for filling said chamber with liquid from said supply responsive to expansion and contraction of the contents of said chamber, and means for draining the liquid from said chamber when the lower end of said tube is opened to permit air to enter said chamber, said draining means comprising a wick having one end extending below said chamber and having a looped portion extending upwardly in said chamber to form a siphon, one leg of said looped portion being connected with the end of said wick which extends outside of said chamber and having the portion thereof within said chamber enclosed the other end of said wick being exposed in the liquid in said chamber.

8. The combination with a source of liquid supply, of a closed container disposed above the surface level of the liquid in said supply, said container having its bottom closed against direct gravity flow of liquid therefrom and means actuated by temperature changes for raising liquid from said supply into said container, said means comprising a tube having its lower end extending into the liquid in said supply and having its upper end opening in the upper portion of said container and above the desired surface level of the liquid in said container in position to permit escape of gas from the upper portion of said container through said tube when the contents of said container expand, and to permit liquid which is discharged into said container from the upper end of said tube to accumulate in said container and fill the major portion thereof without covering the discharge end of said tube, and means for draining the liquid from said container when the surface level of said supply falls below the lower end of said tube, said means comprising a siphon having its short leg disposed near the bottom of said container and having its long leg extending outside of said container and below the bottom thereof.

9. The combination with a source of liquid supply, of a closed container disposed above the surface level of the liquid in said supply, said container having its bottom closed against direct gravity flow of liquid therefrom and means actuated by temperature changes for raising liquid from said supply into said container, said means comprising a tube having its lower end extending into the liquid in said supply and having its upper end opening in the the upper portion of said container and above the desired surface level of the liquid in said container in position to permit escape of gas from the upper portion of said container through said tube when the contents of said container expand, and to permit liquid which is discharged into said container from the upper end of said tube to accumulate in said container and fill the major portion thereof without covering the discharge end of said tube, and means for draining the liquid from said container when the surface level of said supply falls below the lower end of said tube, said last named means comprising a wick in the form of a siphon having its short leg disposed near the bottom of said container and exposed in the liquid therein and having its long leg extending below the bottom of said container, the portion of said long leg above the bottom of said container being separated from the body of the liquid in said container.

ARTHUR O. AUSTIN.